United States Patent [19]

Gysling

[11] Patent Number: 4,550,623

[45] Date of Patent: Nov. 5, 1985

[54] MOTORIZED CABLE MECHANISM FOR POSITIONING TRACTORS IN A PRINTER

[75] Inventor: Peter Gysling, Boise, Id.

[73] Assignee: Hewlett Packard Company, Palo Alto, Calif.

[21] Appl. No.: 545,014

[22] Filed: Oct. 24, 1983

[51] Int. Cl.[4] ............................................. F16H 27/02
[52] U.S. Cl. .................................... 74/89.2; 74/89.22; 226/75; 400/616.1
[58] Field of Search ............... 400/616.1, 616.2, 616.3; 226/74, 75, 79; 74/89.2, 89.21, 89.22

[56] References Cited

U.S. PATENT DOCUMENTS 3,477,626 11/1969 Hilpert .............................. 226/74 X
3,578,138 5/1971 Cantwell ......................... 400/616.1
4,288,044 9/1981 Greding ........................ 74/89.22 X

FOREIGN PATENT DOCUMENTS 2164215 1/1980 Fed. Rep. of Germany ... 400/616.1

Primary Examiner—Stephen F. Husar
Attorney, Agent, or Firm—Leslie G. Murray; William H. MacAllister

[57] ABSTRACT

A cable drive system is provided in which a fixedly mounted reversible motor imparts translational motion to a plurality of pairs of elements such as the right and left pairs of paper moving tractors in a high-speed printer. By means of a continuous cable loop routed around passive rotational elements, each element of a pair of elements, each of which is rigidly attached to the cable, can be translated the same distance in the same direction as the other while the relative alignment of one element with respect to the other element is maintained. Means for selectively translating one pair of elements independently or a plurality of pairs of elements simultaneously while maintaining the distance between the pairs are provided.

19 Claims, 8 Drawing Figures

MOTORIZED CABLE MECHANISM FOR POSITIONING TRACTORS IN A PRINTER

BACKGROUND OF INVENTION

1. Field of the Invention

This invention relates generally to high-speed printers and more particularly to tractor systems for moving the print paper through the printer past the printing mechanism.

2. Description of Prior Art

High-speed printers employed as terminal printers for computer readout and word processing systems generally utilize a continuous paper feed system. A tractor system, driven by a stepper motor, engages perforations provided along each edge of the print paper and steps the print paper past the printing mechanism. In addition, the tractors serve to center the paper in the printer and to guide the paper as it is stepped through the printer. In printers utilizing more than one tractor for each edge of the paper, it is necessary to keep the upper and lower tractors on each edge of the paper precisely aligned to prevent skewing and consequential jamming or tearing of the print paper.

The Hewlett-Packard Model 2619A printer tractor system utilizes two pairs of tractors, each pair consisting of an upper and a lower tractor, one pair for each edge of the print paper. Each tractor is mounted on an individual lead screw and the two lead screws corresponding to each pair of tractors are linked to a reversible motor by means of a non-slipping drive such as a cog belt. Limit switches are provided to prevent overdriving the tractor pairs and consequential damage to the drive motors. While this system is highly satisfactory, it does require either two motors or one motor with a rather complex shifting mechanism which adds to the cost thereof. In addition, to facilitate removal of the tractors, the entire lead screw assembly has to be disassembled.

Other printers utilize a manually operated cable system wherein each tractor is mounted on a cable and each pair of upper and lower tractors is linked together by a belt and pulley system. The primary disadvantage of this system is that the relative alignment between the upper and lower tractors is difficult to maintain because of cable slippage on the pulleys. Dirt or other foreign matter in the system create enough drag to result in cable slippage. Any stretch in the cables has to be compensated for by manual (turnbuckle) adjustment. As in other prior solutions, it is difficult to remove the tractors from the drive system.

Cable systems to provide translational and/or rotational motion to a moving element are well known in the prior art. U.S. Pat. No. 3,926,061 issued to Gary L. Paulson on Dec. 16, 1975, teaches a drive system in which a pair of fixedly mounted motors impart simultaneous and independent rotational and translational motion to a disc such as a print disc containing a character font.

It is also well known to utilize cable and pulley configurations in other applications. One such application consists of a cable in a figure-eight configuration mounted on a drafting table by pulleys at each corner of the drafting table. The opposite ends of a straightedge are coupled to opposite sides of the figure-eight in such a manner that the straightedge is maintained parallel with respect to a reference usually one edge of the drafting table, when it is repositioned on the drafting table.

SUMMARY OF THE INVENTION

In accordance with the preferred embodiment, the present invention provides a drive system in which a fixedly mounted drive mechanism such as a reversible motor is utilized to position two pairs of tractors in a high-speed printer. A pair of tractors include an upper and a lower tractor for engaging one edge of a continuous web element such as continuous print paper for a high-speed printer. Each pair of tractors is mounted on a continuous cable loop arranged in a figure-eight configuration such that when one of the tractors is moved, the other tractor will move the same distance in the same direction as the first tractor while maintaining relative alignment with respect to the first tractor. The cables are guided by pulleys with common centers which are rigidly mounted to the printer main frame. Two drive pulleys, coupled to the motor by a common shaft, are positioned such that the drive pulleys are tangent to the cables. Each cable is double wrapped around its respective drive pulley coupling the cables to the drive motor whereby rotational motion of the drive motor shaft provides translational motion of the tractor pairs. A spring is inserted in each figure-eight loop to provide tension and compensate for any stretching of the cable. The spring also allows for greater tolerance on the pulleys and cable assemblies and eases assembly.

A spring-loaded cable idler mechanism is provided to release the tension on one cable thereby allowing one pair of tractors to be positioned independently of the other pair to adjust the horizontal distance between the pairs of tractors in order to utilize print paper of differing widths. Once the tractors are adjusted for print paper width, both pairs of tractors may be moved together to center the print paper in the printer. The cable idler mechanism also includes a cable brake to insure that one pair of tractors remains stationary while the print paper width adjustment is accomplished.

In accordance with another embodiment of the invention, two drive pulleys are coupled to the drive motor such that a first pulley is directly coupled to the motor shaft while the second pulley is coupled to the motor through a clutch. Engagement of the clutch enables the motor to simultaneously position both pairs of tractors. When the clutch is disengaged, one cable is not coupled to the motor permitting one pair of tractors to be positioned independently of the other pair to adjust for print paper of differing widths.

DESCRIPTION OF PREFERRED EMBODIMENT

Figure 1:
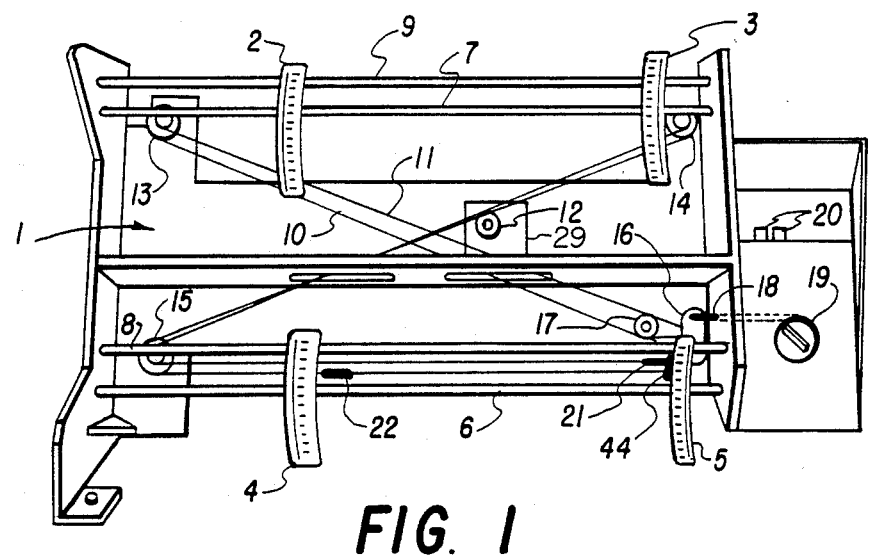
FIG. 1 is a perspective view of a printer system employing a tractor positioning system in accordance with the principles of the present invention.

The preferred embodiment of the present invention is described in conjunction with a high-speed printer as illustrated in FIG. 1. The invention is not limited to the particular printer shown, but it wil be understood by those skilled in the art that the invention can be utilized in any application where it is desired to position at least one pair of moveable elements while maintaining a relative alignment between the moveable elements comprising the pair of elements and the distance between pairs of elements.

Referring to FIG. 1, a high-speed printer is comprised of a main frame 1, upon which the remaining components of the printer are mounted. Tractors 2 and 3, are slidably mounted on metal rod 7 and on shaft 9; tractors 4 and 5 are slidably mounted on metal rod 6 and on shaft 8. The shafts 8 and 9 are coupled to a stepper motor (not shown) which drives the tractors to advance the print paper through the printing mechanism (not shown). The left tractor pair 2 and 4 comprises an upper tractor 2 and a lower tractor 4 rigidly attached to cable loop 10 by tractor bracket assemblies which are shown in greater detail in FIG. 7 and will be described more fully hereinafter. Similarly, the right tractor pair 3 and 5, comprises an upper tractor 3 and a lower tractor 5 attached to cable loop 11 by tractor bracket assemblies (tractor barrel 21 and bracket 44 attach tractor 5 to cable 11, attachment apparatus for the remaining tractors 2, 3 and 4 not shown). The cables 10 and 11 are routed on pulleys 13, 14, 15 and 28 (mounted on idler arm 16 but not shown) in a figure-eight configuration; cable 10 is also routed around pulley 17 mounted on idler arm 16. Each pulley 13, 14, 15 and 28 consists of two concentric pulleys; each pair of concentric pulleys are mounted on a common shaft rigidly attached to the main frame 1. Connector 22 is a metal crimp-type connector connecting the ends of cable 10; cable 11 is similarly connected (connector for cable 11 not shown).

Figure 4:
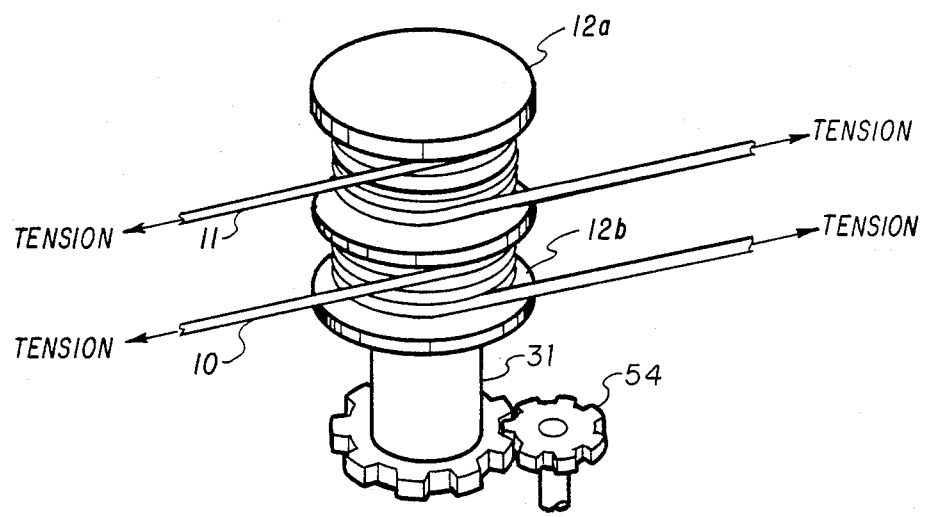
FIG. 4 illustrates the cable wrap on a two-pulley motor shaft employed in the tractor positioning system of FIG. 1.

Drive pulley 12 consists of two identical pulleys having coincident centers and rigidly attached to a drive shaft coupled to a drive motor 29 through a reduction gear 54 as shown in FIG. 4. Drive pulley 12 is disposed tangentially to both cables 10 and 11 and each cable is wrapped around its respective drive pulley twice to provide coupling between the motor and the cables 10,11. Push-button-type switches 20 are provided for manual control of the motor to position the tractors. The motor inertia coupled through the high ratio reduction gear will maintain tractor position once set. The cable wrap coupling requires an initial tension in the cable to operate. A spring (not shown) is inserted in cable loop 11 to maintain constant tension in the cable. Proper tension in cable 10 is provided by the urging force of pulley 17 mounted on a springloaded idler arm 16 against cable 10. Knob 19 is coupled to idler arm 16 by rigid linkage 18. Clockwise rotation of knob 19 will disengage pulley 17 from cable 10 thereby releasing the tension in cable 10. When pulley 17 is disengaged, the right pair of tractors 3 and 5 can be positioned independently of the left pair of tractors 2 and 4. A cable brake (not shown) prevents any movement of the left pair of tractors, 2 and 4, when pulley 17 is disengaged. As a design choice, either the left or the right pair of tractors may be independently positioned to adjust the separation between the pairs of tractors to facilitate print paper of different widths.

Figure 2:
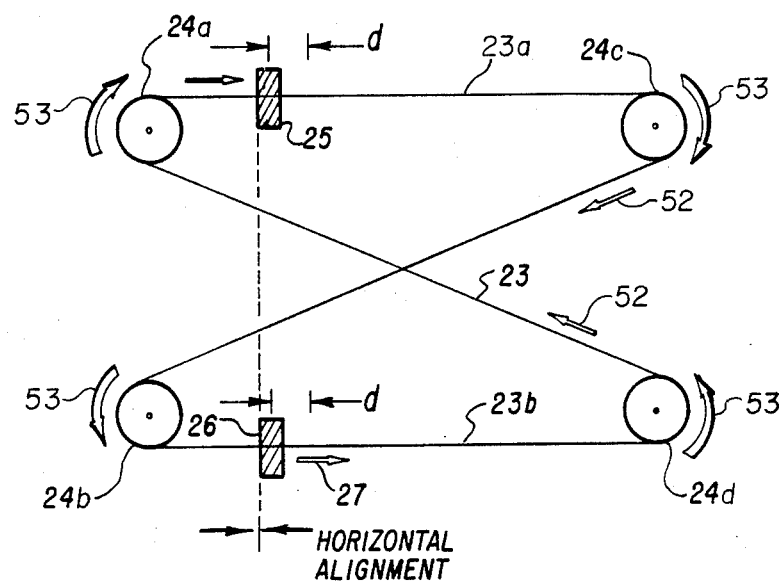
FIG. 2 illustrates the basic figure-eight shaped cable configuration employed in the tractor positioning system of FIG. 1.

FIG. 2 illustrates the basic operation of the cable assembly. Cable 23 is routed around four passive routing elements 24, such as pulleys, in a figure-eight configuration. The cable can be steel or any other suitable material; the pulleys utilized are machined aluminum, but could be molded plastic or other suitable material. To facilitate description of the operation, cable 23 has been arbitrarily divided into sections. Elements 25 and 26 representing one tractor pair are fixedly attached to cable sections 23a and 23b, respectively, such that when cable 32 moves, elements 25 and 26 also move. When cable section 23b is moved in the direction indicated by arrow 27, the remaining sections of cable 23 will move in the directions indicated by the small arrows 52 and the pulleys 24 will rotate in the directions indicated by the large arrows 53. Since there is no slack in the cable, when cable section 23b is moved in the direction indicated by arrow 27 a distance d, cable section 23a will move in the same direction as cable section 23b the same distance d. When the elements 25 and 26 are aligned relative to one another, movement of either of the elements will result in movement of the other element the same distance in the same direction as the first element while maintaining relative alignment with respect to the first element. The pulleys 24 are positioned such that the centers of pulleys 24a and 24b are the same distance apart as the centers of pulleys 24c and 24d and cable section 23a is parallel to cable section 23b. Hence, movement of elements 25 and 27 will be along parallel paths.

Figure 3:
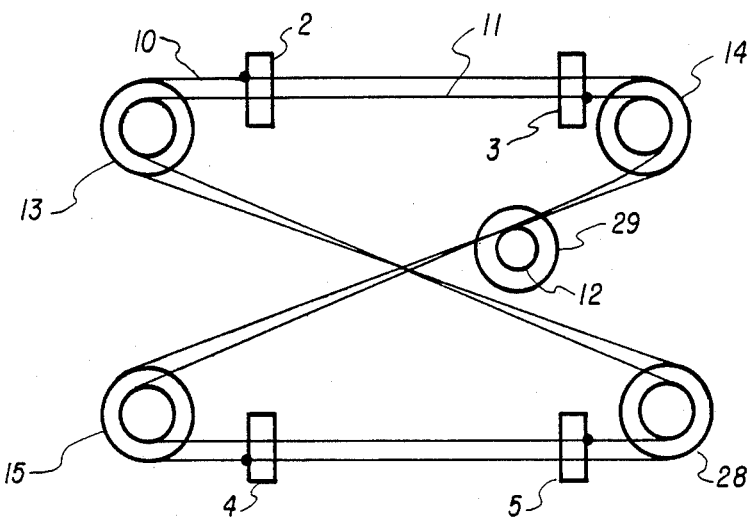
FIG. 3 illustrates a cable configuration which positions two pairs of tractors utilizing one motor employed in the tractor positioning system of FIG. 1.

Referring now to FIG. 3, two cable loops 10 and 11 are routed around pulleys 13, 14, 15 and 28 in a figure-eight configuration. Tractor pair 2 and 4 are fixedly attached to cable loop 10 and tractor pair 3 and 5 are fixedly attached to cable loop 11. Drive pulley 12 is a double pulley 12a and 12b as shown in FIG. 4 and is coupled to motor 29 by drive shft 31 through a reduction gear 54. Drive pulley 12 is located such that both cables 10 and 11 are tangent to the pulley. The cables 10 and 11 are coupled to the motor 29 by double wrapping each cable around its respective pulley 12b and 12a as shown in FIG. 4. Rotational motion of the drive shaft 31 produces translational motion of the cables 10 and 11, thereby simultaneously moving both pairs of tractors.

Figure 5:
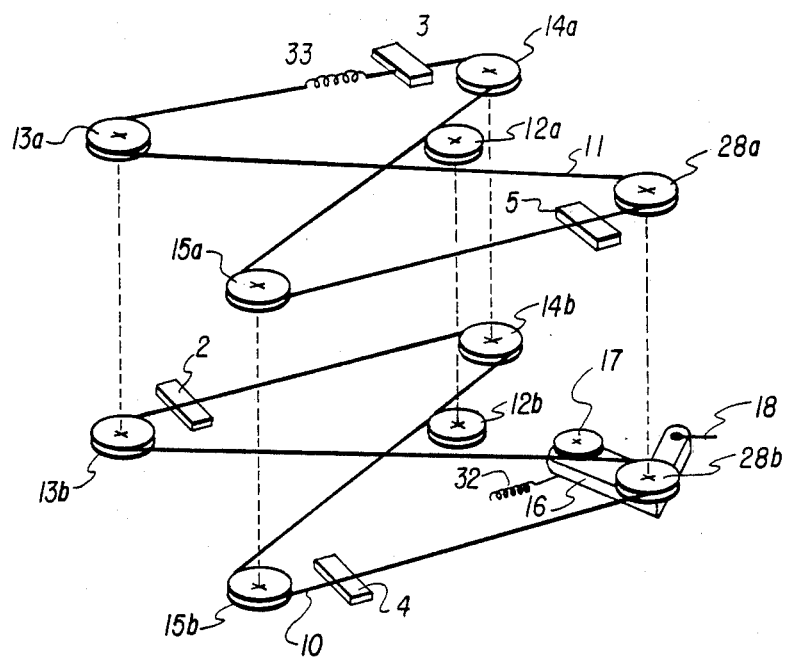
FIG. 5 illustrates an embodiment of the invention utilizing a spring-loaded idler arm employed in the tractor positioning system of FIG. 1.

Referring now to FIG. 5, a spring 33 is inserted in cable loop 11 to maintain the proper tension required for the cable wrap to operate without slippage. The spring 33 is positioned in cable loop 11 such that the motor pulley 12a is coupled directly to a tractor 3 or 5 rather than through spring 33 to insure that any initial cable slack or stretch does not result in misalignment of the tractors 3 and 5. Pulleys 28a and 28b are rotationally mounted on a common shaft to the main frame 1 through spring-loaded idler arm 16. Pulley 17 mounted on idler arm 16 is urged against cable 10 by spring 32 to maintain the required tension in cable loop 10.

Figure 6:
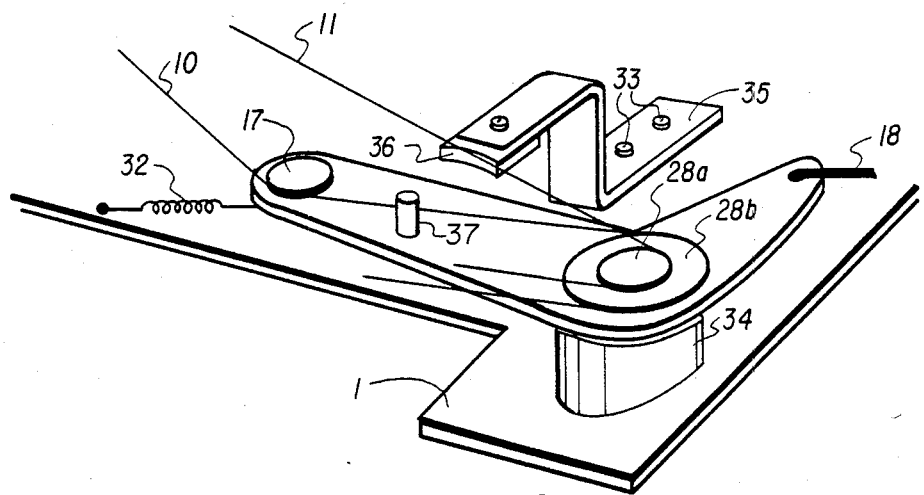
FIG. 6 illustrates the spring-loaded idler arm and cable brake mechanism employed in the tractor positioning system of FIG. 1.

Referring now to FIG. 6, idler arm 16 and pulleys 28a and 28b are mounted on a common shaft (not shown) attached to standoff 34 which is an integral part of the printer main frame 1. Cable 11 is routed around pulley 28a only. Cable 10 is routed around both pulley 28b and pulley 17. Spring 32 is attached between printer main frame 1 and one end of the idler arm, thereby urging pulley 17 into engagement with cable 10. When pulley 17 is engaged with cable 10, spring 32 acts as a tensioning spring in cable loop 10 and the motor will drive both sets of tractors simultaneously.

The idler arm 16 is coupled to a control knob 19 (FIG. 1) by a rigid linkage 18. Clockwise rotation of knob 19 (FIG. 1) will result in a clockwise rotation of the idler arm 16 with respect to its mounting shaft (not shown). Clockwise rotation of the idler arm 16 will disengage pulley 17 from cable 10 which will release the tension on the left cable loop (cable 10). Since there is not sufficient tension in the left cable loop 10 for the cable wrap to operate, the motor will only drive the right set of tractors 3 and 5 (FIG. 1). Clockwise rotation of the idler arm 16 will also clamp cable 10 between dowel pin 37 and a brake pad 36 to insure that no movement of the left pair of tractors 2 and 4 (FIG. 1) occurs while repositioning the right pair of tractors 3 and 5 (FIG. 1). The brake pad 36 is mounted on bracket 35 which is fixedly attached to the print main frame 1 by screws 33. The brake pad 36 may be made of hard rubber or any other suitable material with a durometer of at least 60 shore A scale.

Figure 7:
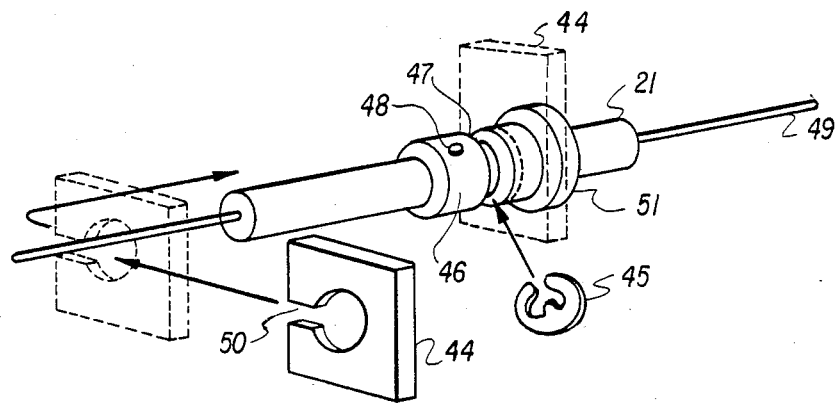
FIG. 7 illustrates the attachment of the tractor bracket to the cable employed in the tractor positioning system of FIG. 1.

The tractors are attached to the cable in such a manner as to allow simple installation, removal and initial alignment. FIG. 7 illustrates the tractor bracket assembly and installation and removal of the tractor bracket 44. Each cable 49 (cable loop 10 or 11, FIG. 1) has a tractor barrel 21 crimped to the cable at each position that attachment of a tractor is desired and a tractor stop sleeve 46 mounted on the tractor barrel 12. To install the tractor bracket 44, the cable 49 is slipped through the slot 50 and the tractor bracket 44 slid over the tractor stop sleeve 46 against the tractor stop 51. The tractor bracket is held in position by E ring 45 in slot 47. Coarse alignment of the tractors is accomplished by positioning of the tractor barrel 21 prior to crimping it to the cable 49. Fine alignment of the tractors is accomplished by adjusting the position of the tractor stop sleeve 46 on the tractor barrel 21 and locking it in place with set screw 48. The tractor bracket assembly components are constructed of metal or some other suitable material. The tractor stop sleeve 46 is constructed of brass or other suitable material.

Figure 8:
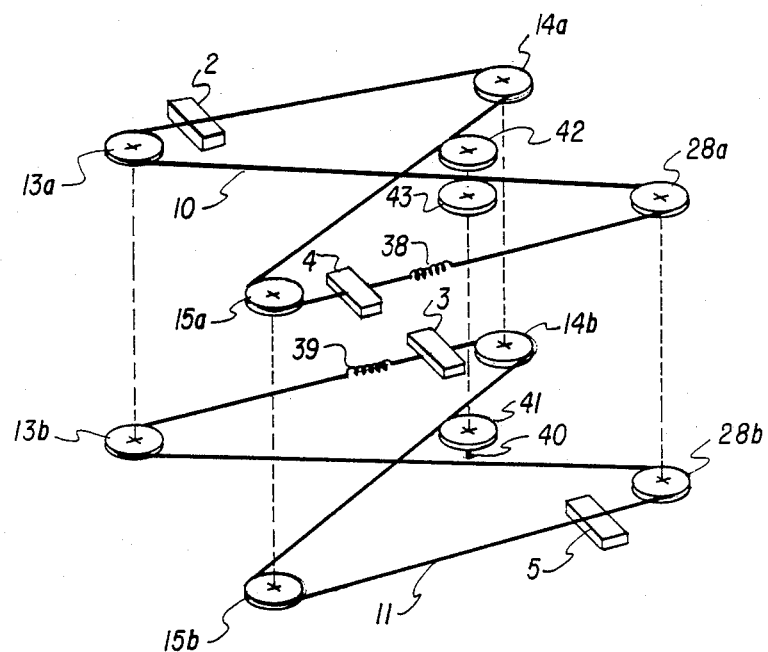
FIG. 8 illustrates another embodiment of the invention utilizing a drive pulley clutch mechanism.

FIG. 8 illustrates another embodiment of the invention. The cable loops 10 and 11 are configured and operate as described above in connection with FIGS. 2 and 3. The tractors 2, 4, 3 and 5 are atached to the cables 10 and 11 as described above in connection with FIG. 7. Spring 38 is inserted in cable loop 10 and spring 39 is inserted in cable loop 11 to provide the cable tension required for the cable wrap drive (as described above in connection with FIG. 4) to operate without cable slippage and to compensate for any cable stretch. Drive pulley 41 is rigidly attached to shaft 40 and shaft 40 is coupled to a drive motor (as shown in FIG. 3) through a reduction gear (as shown in FIG. 4). Drive pulley 42 is coupled to drive pulley 41 by a clutching mechanism 43. When the clutching mechanism 43 is engaged, drive pulley 42 is rigidly coupled to drive pulley 41 and rotational motion of the drive motor shaft 40 is transformed to translational motion of the cables 10 and 11, thereby driving both pairs of tractors simultaneously. When the clutching mechanism 43 is disengaged, drive pulley 42 is mechanically isolated from drive pulley 41 and the drive motor will translate the right pair of tractors 3 and 5 independently of the left pair of tractors 2 and 4.

What is claimed is:

1. A drive system for imparting translational motion to a plurality of pairs of elements, the elements of each pair having a fixed relationship with respect to each other, for moving a continuous web element, said drive system comprising:
    a support;
    drive means fixedly mounted on said support for providing rotational motion;
    at least two linking means coupled to the drive means;
    at least two pairs of elements slidably coupled to the support for translational motion with respect to said support, each pair of said elements being fixedly attached to a respective one of said linking means; and
    a plurality of routing means mounted on said support for routing each of said linking means such that each of said linking means, responsive to rotational motion of the drive means, moves each element of said pair of elements in the same direction and the same distance with respect to said support.

2. A drive system as in claim 1 wherein the routing means is disposed for routing each of said linking means such that each of said linking means, responsive to rotational motion of the drive means, moves each element of said pair of elements along parallel paths.

3. A drive system as in claim 2 wherein the drive means comprises a reversible motor.

4. A drive system as in claim 3 wherein each of said linking means comprises:
    a continuous cable loop; and
    tensioning means included in said cable loop to tension said cable loop.

5. A drive system as in claim 4 wherein at least one cable loop includes a cable idler means to release the tension in said cable loop.

6. A drive system as in claim 5 wherein the cable idler means includes:
    an idler arm rotationally mounted on said support having an engaged position for imparting tension to the cable loop and a disengaged position for releasing said tension in said cable loop; and
    cable locking means to prevent movement of said pair of elements in response to rotational motion of said motor when the idler arm is rotated to said disengaged position.

7. A drive system as in claim 6 wherein the cable locking means comprises:
    pin means fixedly mounted on the idler arm; and
    a braking means fixedly mounted on said support and positioned such that when the idler arm is rotated to the disengaged position said pin means urges said cable into engagement with said braking means.

8. A drive system as in claim 4 wherein the drive means further includes:
    a high-ratio reduction gear coupled to said reversible motor; and
    coupling means coupled to said reduction gear to provide coupling between the motor and the linking means.

9. A drive system as in claim 8 wherein the coupling means includes:
    at least two drive pulleys mounted on a common shaft coupled to said reduction gears for providing coupling between the motor and the linking means; and clutching means mounted on said common shaft having an engaged position and a disengaged position, said engaged position for coupling all of said drive pulleys to said reduction gear and said disengaged position for decoupling at least one of said drive pulleys from said reduction gear.

10. In a high-speed printer, a system for positioning a plurality of pairs of paper-moving tractors comprising:
 a support;
 drive means fixedly mounted on said support for providing rotational motion;
 at least two linking means coupled to the drive means;
 at least two pairs of tractors slidably coupled to the support for translational motion with respect to said support and each of said pairs of tractors being fixedly attached to a respective one of said linking means; and
 a plurality of routing means mounted on said support for routing each of said linking means such that each of said linking means, responsive to rotational motion of the drive means, moves each tractor of said pair of tractors in the same direction and the same distance with respect to said support.

11. The system as in claim 10 wherein the drive means comprises a reversible motor.

12. The system as in claim 11 wherein the drive means further includes:
 a high-ratio reduction gear coupled to said reversible motor; and
 a cuopling means coupled to said reduction gear to provide coupling between the motor and the linking means.

13. A system as in claim 12 wherein the coupling means includes:
 at least two drive pulleys mounted on a common shaft coupled to said reduction gear for providing coupling between the motor and the linking means, and
 clutching means mounted on said common shaft having an engaged position and a disengaged position, said engaged position for coupling all of said drive pulleys to said reduction gear and said disengaged position for decoupling at least one of said drive pulleys from said reduction gear.

14. The system as in claim 11 wherein each of said linking means includes:
 a continuous cable loop; and
 a tensioning means included in said loop to tension said cable loop.

15. The system as in claim 14 wherein at least one cable loop includes a cable idler means to release the tension in said cable loop.

16. The system as in claim 15 wherein the cable idler means includes:
 an idler arm rotationally mounted on said support having an engaged position for imparting tension to the cable loop and a disengaged position for releasing said tension in said cable loop; and
 cable locking means to prevent movement of said pair of tractors in response to rotational motion of said motor when the idler arm is rotated to said disengaged position.

17. A system as in claim 16 wherein the cable locking means comprises:
 pin means fixedly mounted on the idler arm; and
 braking means fixedly mounted on said support and disposed such that when the idler arm is rotated to the disengaged position said pin means urges said cable into engagement with said braking means.

18. The system as in claim 14 wherein the linking means further includes a plurality of tractor bracket assemblies fixedly attached to said cable loop for mounting said tractors on said cable loop.

19. The system as in claim 18 wherein each tractor bracket assembly includes:
 a tractor barrel fixedly attached to said cable loop;
 a cylindrical tractor stop sleeve having an integrally molded flange and adjacent slot, said stop sleeve slidably mounted over said tractor barrel;
 a tractor bracket removeably mounted on said tractor stop sleeve;
 an E-type snap ring for mounting in said slot and locking said tractor bracket against said flange; and
 a set screw threaded through said tractor stop sleeve for locking said tractor stop sleeve in position to said tractor barrel.

* * * * *

UNITED STATES PATENT AND TRADEMARK OFFICE
CERTIFICATE OF CORRECTION

PATENT NO. : 4,550,623

DATED : November 5, 1985

INVENTOR(S) : Peter Gysling

It is certified that error appears in the above-identified patent and that said Letters Patent is hereby corrected as shown below:

Column 3, line 14 of the Patent, delete "wil", insert --will--.

Column 4, line 18 of the Patent, delete "32", insert --23--.

Column 5, line 51 of the Patent, delete "atached", insert --attached--.

In the Claim 12, column 7, line 32 of the Patent, delete "cuopling", insert --coupling--.

Signed and Sealed this

Twenty-fourth Day of February, 1987

Attest:

DONALD J. QUIGG

Attesting Officer

Commissioner of Patents and Trademarks